E. J. BOSMA.
APPARATUS FOR MOLDING HOLLOW CONCRETE WALLS.
APPLICATION FILED JAN. 26, 1917.
1,246,532. Patented Nov. 13, 1917.
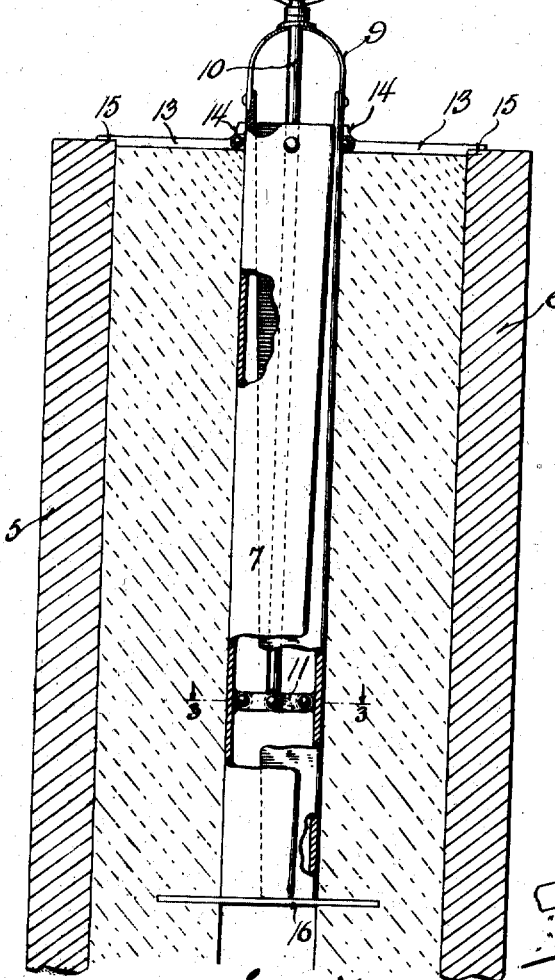
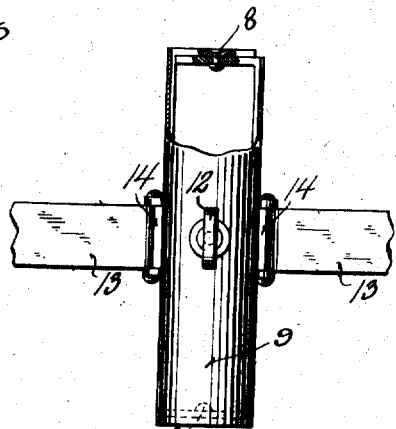
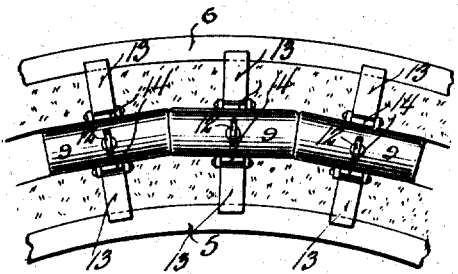
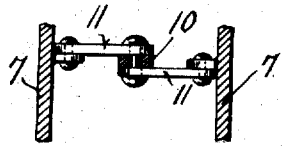
Witness:
George Mueller
Inventor:
Egbert J. Bosma
By Geo. W. Young,
Attorney.

UNITED STATES PATENT OFFICE.

EGBERT J. BOSMA, OF NEW HOLSTEIN, WISCONSIN.

APPARATUS FOR MOLDING HOLLOW CONCRETE WALLS.

1,246,532.  Specification of Letters Patent.  Patented Nov. 13, 1917.

Application filed January 26, 1917. Serial No. 144,586.

*To all whom it may concern:*

Be it known that I, EGBERT J. BOSMA, a citizen of the United States, and resident of New Holstein, in the county of Calumet and State of Wisconsin, have invented certain new and useful Improvements in Apparatus for Molding Hollow Concrete Walls; and I do hereby declare that the following is a full, clear, and exact description thereof.

My invention relates to new and useful improvements in means for molding hollow concrete walls.

Heretofore the method employed in forming hollow concrete walls has been to mold the concrete in blocks, and then build said blocks into inner and outer wall sections to from the desired air space therebetween.

It is primarily the object of my invention to provide a method whereby a hollow concrete wall, either curved or straight may be molded in place and it is more particularly an object to provide a method for molding the wall in successive superposed sections. Essentially, my method consists in providing outer mold members, and core members held in place by said mold members and adapted to fill the desired air space in the wall, these core members being removable for successive associations with the outer mold members upon their being raised for molding the superposed section of wall.

It is more particularly an object of my invention to provide core sections of this nature which are collapsible whereby they may be most readily removed from the molded sections of wall, and which are adapted for most convenient manipulation in disposing and holding them in position between the outer and inner mold walls.

With the above and other objects and advantages in view, the invention resides more particularly in the novel combination, formation and arrangement of parts hereinafter described and pointed out in the appended claims.

In the drawings:

Figure 1 is a vertical sectional view through a molded section of hollow wall, showing one of the core sections in place therein.

Fig. 2 is a top plan view of one of the core sections.

Fig. 3 is a transverse sectional view through one of the sections on the line 3—3 of Fig. 1.

Fig. 4 is a plan view of a molded section of silo wall.

Referring now more particularly to the accompanying drawings, 5 and 6 designate the outer mold members for a wall and these mold members may be either straight or they may be circular as shown in Fig. 4 for molding a silo wall.

Each of my core units comprises a casing formed of a pair of elongated sections 7 U-shaped in cross section and having their sides disposed in lapped relation and pivotally connected at their upper ends by the bolts 8, said sides being preferably taperingly reduced toward their lower ends whereby to permit a contraction of the core unit to a substantially wedged shaped outline. Secured to the upper ends of the sections 7 are the edges of a plate 9 of inverted U-shape and passed through the bight portion of this plate is a bar 10 extending into the lower portion of the core unit and pivoted to a pair of links 11 which are in turn pivoted to the core sections. The bar 10 carries a handle 12 on its upper end and thus by moving the bar longitudinally the core section may be expanded or contacted to permit its ready removal from between the molded wall portions. For holding the core units in operative position, outstanding wing plates 13 are pivoted to the sections 7 at their upper ends and these sections are provided with lateral extensions 14 adapted to abut the sections whereby to limit swinging movement of the wing plates upwardly past a position at right angles to the sections. The outer ends of the wing plates are recessed at 15 to receive the upper edge portions of the mold members 5 and 6.

In operation, the mold members are mounted in abutting relation and the upper edges of the mold members 5 and 6 are so adjusted that the bottom of the core units are flush with the top of the previously formed wall section. Concrete is then poured between the mold members and the core units and upon becoming sufficiently hardened the core units are contracted by raising the bars 10 and are withdrawn to provide for subsequent similar operations.

By the provision of the recesses 15 it is noted that the lower surfaces of the wing plates 13 project below the top edges of the mold members 5 and 6. Thus transverse grooves are formed in the wall sections, and these grooves are preferably utilized for the reception of tie bars 16 which are set thereinto and serve to hold the wall portions in proper relation when embedded between the sections.

The core units are of such size that they may be readily handled, and that they may adapt themselves to curved walls, as shown more particularly in Fig. 4.

What is claimed is:

1. A core unit comprising a pair of elongated sections U-shaped in cross section, and having their sides disposed in lapped slidable relation, pivot pins passed through the upper ends of the sides of said sections, a U-shaped plate having its side edges secured to the upper ends of the sections, the area in plan of said plate being equal to the area of the top of the core, and means for controlling relative pivotal movement of the sections comprising a bar slidably passed through said flexible plate and links pivoted to the bar and to the sections.

2. A core unit comprising a collapsible casing, wings pivoted to and projecting outwardly from the upper end of the casing and the outer portions of the wings being recessed to receive suitable supports.

In testimony that I claim the foregoing I have hereunto set my hand at New Holstein, in the county of Calumet and State of Wisconsin, in the presence of two witnesses.

EGBERT J. BOSMA.

Witnesses:
FREDERICK BULLWINKEL,
ALMA ARPS.

Copies of this patent may be obtained for five cents each, by addressing the "Commissioner of Patents, Washington, D. C."